United States Patent
Amishige et al.

(10) Patent No.: US 8,652,436 B2
(45) Date of Patent: Feb. 18, 2014

(54) MATERIAL FOR WATER GAS

(75) Inventors: Yasuo Amishige, Wakayama (JP);
Takeshi Shirasawa, Wakayama (JP)

(73) Assignee: Kao Corporation, Tokyo (JP)

( * ) Notice: Subject to any disclaimer, the term of this patent is extended or adjusted under 35 U.S.C. 154(b) by 244 days.

(21) Appl. No.: 13/129,236

(22) PCT Filed: Nov. 16, 2009

(86) PCT No.: PCT/JP2009/006116
§ 371 (c)(1),
(2), (4) Date: May 13, 2011

(87) PCT Pub. No.: WO2010/055687
PCT Pub. Date: May 20, 2010

(65) Prior Publication Data
US 2011/0220849 A1    Sep. 15, 2011

(30) Foreign Application Priority Data
Nov. 14, 2008 (JP) .................. 2008-292243

(51) Int. Cl.
*C01B 3/12* (2006.01)
*C01B 3/22* (2006.01)
*C09K 3/00* (2006.01)

(52) U.S. Cl.
USPC .................. 423/655; 252/183.13; 423/418.2; 423/648.1; 423/656

(58) Field of Classification Search
USPC ............. 252/182.23, 182.24, 182.25, 182.26, 252/182.27, 182.28, 183.13; 423/648.1, 423/418.2, 655, 656
See application file for complete search history.

(56) References Cited

U.S. PATENT DOCUMENTS

| 8,114,174 B2 * | 2/2012 | Shirasawa et al. ................. 48/61 |
| 8,277,733 B2 * | 10/2012 | McSherry et al. ............ 422/105 |
| 2009/0249692 A1 | 10/2009 | Shirasawa et al. |
| 2011/0143240 A1 * | 6/2011 | Hsueh et al. .................. 429/426 |
| 2012/0282163 A1 * | 11/2012 | Cortright et al. ........... 423/418.2 |

FOREIGN PATENT DOCUMENTS

| JP | 2009-51703 A | 3/2009 |
| JP | 2009-51704 A | 3/2009 |
| WO | 2007/075476 | * 7/2007 |
| WO | 2007/114438 A1 | 10/2007 |

OTHER PUBLICATIONS

International Preliminary Report on Patentability, and Translation of Written Opinion of the International Searching Authority, dated Jun. 30, 2011, for International Application No. PCT/JP2009/006116 (Forms PCT/IB/338, PCT/IB/373 and PCT/ISA/237).

(Continued)

*Primary Examiner* — Wayne Langel
(74) *Attorney, Agent, or Firm* — Birch, Stewart, Kolasch & Birch, LLP

(57) ABSTRACT

A material for water gas contains polyhydric alcohol, and hydroxycarboxylic acid.

8 Claims, 1 Drawing Sheet

(56) References Cited

OTHER PUBLICATIONS

International Search Report, PCT/JP2009/006116, Feb. 9, 2010.
Valliyappan et al., "Production of Hydrogen and Syngas via Steam Gasification of Glycerol in a Fixed-Bed Reactor", Topics in Catalysis, vol. 49, Nos. 1-2, Jul. 2008, pp. 59-67.
Akande et al., "Synthesis, characterization and performance evaluation of Ni/Al2O3 catalysts for reforming of crude ethanol for hydrogen production", Applied Catalysis A:, General 287, 2005, pp. 159-175.
Cortright et al., "Hydrogen from catalytic reforming of biomass-derived hydrocarbons in liquid water", Nature, vol. 418, Aug. 29, 2002, pp. 964-967, XP002388667.
Extended European Search Report for corresponding European Application No. 09825940.1 dated Aug. 21, 2013.

* cited by examiner

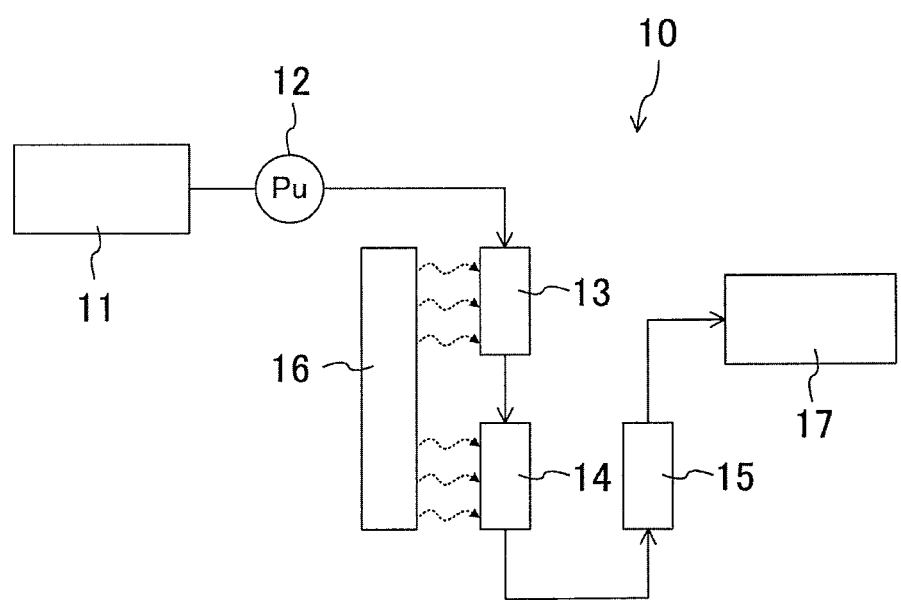

MATERIAL FOR WATER GAS

TECHNICAL FIELD

The present invention relates to a material for water gas, a method for producing water gas, and the water gas.

BACKGROUND ART

Glycerin is a by-product of a process of producing biodiesel which is an alternative fuel for automobiles. Glycerin can be used as energy when converted to water gas by steam reforming, and is considered as a carbon-neutral energy resource effective for global environmental protection.

Patent Document 1 teaches that reaction conditions for producing water gas, such as the type of a catalyst, a steam ratio S/C (a molar ratio of water relative to carbon atoms), and reaction temperature, are optimized based on the type of a material of the water gas. Patent Document 1 also teaches that a Ni- or Ru-based catalyst, a steam ratio S/C of 1-6, and a reaction temperature of 300-700° C. are suitable for producing the water gas from glycerin.

CITATION LIST

Patent Document

[Patent Document 1] International Patent Publication No. WO2007/114438

SUMMARY OF THE INVENTION

A material for water gas of the present invention contains polyhydric alcohol, and hydroxycarboxylic acid.

A method for producing the water gas of the present invention includes: introducing polyhydric alcohol, hydroxycarboxylic acid, and water in a reactor containing a catalyst; and causing steam reforming in the reactor.

A water gas of the present invention is obtainable by introducing polyhydric alcohol, hydroxycarboxylic acid, and water in a reactor containing a catalyst; and causing steam reforming in the reactor.

BRIEF DESCRIPTION OF THE DRAWINGS

The drawing is a block diagram illustrating the structure of a reaction device.

DESCRIPTION OF EMBODIMENTS

An embodiment will be described in detail below.

(Material for Water Gas)

A material for water gas of the present embodiment is used for producing water gas described below, and contains polyhydric alcohol and hydroxycarboxylic acid.

Examples of polyhydric alcohol include, for example, divalent alcohols such as ethylene diglycol, 1,2-propanediol, 1,3-propanediol, 2,3-hydroxypropanal, 1,2-butanediol, 1,3-butanediol, 1,4-butanediol, tartaric acid, etc., trivalent alcohols such as glycerin, 1,2,4-butanetriol, 1,2,6-hexanetriol, etc., and tetravalent alcohols such as pentaerythritol. Among them, divalent or trivalent alcohols are preferable, and ethylene diglycol and glycerin are particularly preferable in view of yield of the produced water gas, and biological safety thereof. One type of polyhydric alcohols may be used alone, or two or more types of them may be used in a mixed state.

Examples of hydroxycarboxylic acid include, for example, those described in "Compound Dictionary" (edited by Susumu Takamoto, Naoki Inamoto, Masayoshi Nakahara, and Akira Yamazaki, Asakura Publishing Co., Ltd. (1997) pp. 500-509), such as glycolic acid, lactic acid (d-form (L(+)-, or S-form), l-form (D(−)-, or R-form), or dl-form), 2-hydroxybutyric acid, 3-hydroxybutyric acid (d-, l-, or dl-form), 4-hydroxybutyric acid, 2-hydroxy-2-methylpropanoic acid, leucinic acid (d-, l-, or dl-form), 2-ethyl-2-hydroxybutyric acid, hydroacrylic acid, 10-hydroxyoctadecanoic acid, ricinoleic acid, ricinoelaidic acid, etc. Among them, in view of biological safety of hydroxycarboxylic acid, and to prevent side reaction of hydroxycarboxylic acid, those in which the number of carbon atoms contained in a molecule is 2-4, e.g., glycolic acid and lactic acid, are preferable, and lactic acid (d-form (L(+)-form) is particularly preferable. Hydroxycarboxylic acid preferably has a boiling point of 400° C. or lower, preferably 300° C. or lower. One type of hydroxycarboxylic acids may be used alone, or two or more types of them may be mixed.

The content of hydroxycarboxylic acid is preferably 0.1 parts by mass or more, more preferably 1 part by mass or more, relative to 100 parts by mass of polyhydric alcohol to reduce generation of soot. In view of cost efficiency, the content of hydroxycarboxylic acid is preferably 50 parts by mass or less, more preferably 10 parts by mass or less.

The material for water gas may further contain water. Water may be, for example, distilled water, deionized water, etc.

The content of water is preferably 0.3-10, more preferably 1-6, in molar ratio relative to carbon atoms contained in polyhydric alcohol. For example, when polyhydric alcohol is glycerin, the content of water is preferably 0.9-30, more preferably 3-18, in molar ratio.

The material for water gas of the present embodiment may further contain univalent alcohols (methanol, ethanol, etc.), hydrocarbons (methane, ethane, etc.), ethers (dimethyl ether, diethyl ether, etc.), aldehydes (formaldehyde, acetaldehyde, etc.), etc.

The material for water gas of the present embodiment contains water as a source of steam. However, the material for water gas is not limited to a material containing water, and may be a material containing no water, to which steam is supplied from outside in producing the water gas.

(Production of Water Gas)

The drawing shows a reaction device 10 used for producing the water gas of the present embodiment.

The reaction device 10 is a continuous device capable of continuously producing water gas as a reaction product, and includes a pipe extending from a material feeding part 11, which is a source of a material for water gas, to a product collecting part 17. From the upstream to the downstream of the pipe, a material feeding pump 12, a preheater 13, a reactor 14, and a cooler 15 are arranged in this order at intervals, and are connected in series. A heater 16 is provided to heat the preheater 13 and the reactor 14. A pressure regulator (not shown) is provided upstream of the product collecting part 17.

The material feeding part 11 may be, for example, a liquid reservoir. The material feeding part 11 preferably has a temperature adjusting mechanism, and a stirring mechanism.

Examples of the material feeding pump 12 include, for example, a centrifugal pump, a diffuser pump, a centrifugal mixed flow pump, a mixed flow pump, an axial flow pump, a gear pump, a screw pump, a cam pump, a vane pump, a piston pump, a plunger pump, a diaphragm pump, a vortex pump, a viscosity pump, an air-lift pump, a jet pump, an electromagnetic pump, etc. Among them, those which produce less pulsating flow are preferable. This is because when a fluid material for water gas is distributed to a passage without producing the pulsating flow, uniform and stable flow can be kept in every part of the passage, and mixing occurs stably. This is advantageous in that reaction occurs without problems, and the reaction occurs stoichiometrically with desired reactivity and high selectivity. The material for water gas fluid may be fed to the preheater 13 by using differential pressure, in place of using the material feeding pump 12.

The preheater 13 is in the shape of a pipe, for example, and includes an inlet, an outlet, and a preheating passage provided between the inlet and the outlet.

The reactor 14 is in the shape of a pipe, for example, and includes an inlet, an outlet, and a reaction passage provided between the inlet and the outlet.

The reaction passage of the reactor 14 may be formed by bringing a member having a groove formed in its surface by cutting into close contact with another member. The reaction passage may be formed by an existing pipe, such as a square pipe, a circular pipe, etc.

When viewed in cross section, the reaction passage may be in the shape of a circle, a semicircle, an ellipse, a semiellipse, a square, a rectangle, a trapezoid, a parallelogram, etc., or may be indefinite in shape. In a longitudinal direction from the inlet to the outlet, the reaction passage may be linear, round, serpentine, spiral, etc.

A catalyst is provided in the reaction passage in the reactor 14.

The catalyst may be metal which is generally used for steam reforming of polyhydric alcohol and water. In particular, Group 8-12 metals, preferably Group 8-10 metals, may suitably be used from an industrial view. Examples of such metal include, for example, iron, cobalt, nickel, copper, zinc, ruthenium, rhodium, palladium, osmium, iridium, platinum, etc. Among them, the Group 8-10 metals are suitable because they are industrially cost-effective, easily available, and safe. In particular, nickel, ruthenium, palladium, and platinum are more preferable. The metal may be supported on a carrier to increase a surface area, and to provide mechanical strength and improved catalyst performance. In this case, the carrier may be, for example, silica, alumina, silica alumina, titania, zirconia, diatomaceous earth, activated carbon, etc. The catalysts may be used in combination, or may be surface-treated in advance by reduction using hydrogen, or oxidation using oxygen or air to control the reduced-oxidized state of their surfaces.

The catalyst may be configured to have a surface extending in the direction of flow of the fluid, or may be powder particles, or granules.

The catalyst having the surface extending in the flow direction may be, for example, a linear structure such as a metal wire, a bundle of wires, or a strand, a narrow structure such as a plate, or an inner wall of the reactor 14 constituting the reaction passage. The catalyst may be provided to continuously extend in the flow direction, or may be constituted of portions provided discontinuously in the flow direction. When the flow becomes turbulent, the flow direction varies over time, and is not fixed. In this case, the flow direction designates a direction which is averaged over time.

When the narrow catalyst structure is used, an outer surface thereof corresponds to the surface extending in the flow direction. When the reactor 14 includes the reaction passage formed by assembling the members, the catalyst can be provided in the groove formed in one of the members. When the reactor 14 includes the reaction passage constituted of the existing pipe, the catalyst can be inserted in the reaction passage. The catalyst may be arranged in the reaction passage to form helices having a pitch in the flow direction. A plurality of catalysts may discontinuously be arranged in the flow direction to constitute the surface extending in the flow direction. The catalyst may be arranged in every part of the reactor 14 from the inlet to the outlet, or only part of the reactor 14.

When the inner wall of the reaction passage constitutes the catalyst, a surface of the inner wall corresponds to the surface extending in the flow direction. In this case, the catalyst metal may be used as metal constituting the inner wall of the reaction passage, or may be provided on the inner wall of the reaction passage by plating, sputtering, applying and drying, etc. The catalyst metal may constitute the inner wall discontinuously in the flow direction. The catalyst may be provided in every part of the reactor 14 from the inlet to the outlet, or only part of the reactor 14.

When the powder particles or granules are used as the catalyst, for example, the reaction passage may be filled with the powdery or granular catalyst. The granules may be in the shape of, for example, pellets, noodles, tablets, or may be in the conventionally known shape.

The cooler 15 is in the shape of a pipe, for example, and has an inlet, an outlet, and a cooling passage provided between the inlet and the outlet. The cooler 15 may be an air-cooling cooler, or a water-cooling cooler.

For example, the heater 16 may be a heater which allows heat exchange between the fluid and a heating medium such as hot oil, steam, etc., a heater which heats the fluid through contact with or radiation from a heat generator such as an electric heater, or a heater using a heat pump.

The product collecting part 17 may be, for example, a gas reservoir.

A method for producing the water gas of the present embodiment using the reaction device 10 will be described below.

According to the method for producing the water gas of the present embodiment, the material for water gas of the present embodiment is placed in the material feeding part 11 of the reaction device 10. Then, the material feeding pump 12 and the heater 16 are operated to feed the material for water gas fluid from the material feeding part 11 to the preheater 13 through the material feeding pump 12, to preheat the fluid by the preheater 13 heated by the heater 16, and to feed the preheated fluid to the reactor 14. The fluid is steam-reformed in the reactor 14 to produce water gas. The resulting fluid which contains the water gas produced in the reactor 14 is fed to the cooler 15, and is condensed. Then, the resulting fluid containing the water gas from the cooler 15 is collected in the product collecting part 17.

Specifically, the material for water gas fluid is steam-reformed through a decomposition reaction of polyhydric alcohol based on the following reaction formula (1) to produce the water gas, which is mixed gas of hydrogen and carbon monoxide. In addition, the produced carbon monoxide reacts with water through a shift reaction of the water gas based on the following reaction formula (2) to secondarily produce hydrogen.

$$C_a H_b (OH)_c + (a-c) H_2 O \longrightarrow a CO + \frac{2a+b-c}{2} H_2 \quad (1)$$

$$CO + H_2 O \rightleftharpoons CO_2 + H_2 \quad (2)$$

The preheater 13 preferably preheats the material for water gas to 200-1000° C., more preferably to 500-700° C. For example, when polyhydric alcohol is glycerin or ethylene diglycol, the preheat temperature is preferably 200-1000° C., more preferably 500-700° C. The preheat temperature can be adjusted by controlling the heating temperature of the heater 16.

In the reactor 14, polyhydric alcohol and water are preferably reacted for about 0.1 second to 1 hour, more preferably for 1 second to 10 minutes. For example, when polyhydric alcohol is glycerin or ethylene diglycol, the reaction time is preferably about 0.1 second to 1 hour, more preferably 1 second to 10 minutes. The reaction time is time during which the fluid remains in the reactor 14. Therefore, the reaction time can be adjusted by setting the feeding rate of the fluid material for water gas from the material feeding pump 12 based on the volume of the reactor 14.

Polyhydric alcohol and water are preferably reacted at 200-1000° C., more preferably at 400-800° C., particularly preferably at 500-700° C. For example, when polyhydric alcohol is glycerin or ethylene diglycol, the reaction temperature is preferably 200-1000° C., more preferably 400-800° C., particularly preferably 500-700° C. The reaction temperature can be adjusted by controlling the heating temperature of the heater 16.

Polyhydric alcohol and water are preferably reacted at a pressure of 0.01-10 MPa, more preferably at 0.1-1 MPa. For example, when polyhydric alcohol is glycerin or ethylene diglycol, the reaction pressure is preferably 0.01-10 MPa, more preferably 0.1-1 MPa. The reaction pressure can be adjusted by a pressure regulator.

A steam ratio S/C (a molar ratio of water relative to carbon atoms) in the reactor 14 is preferably 0.3-10, more preferably 1-6.

The fluid in the reactor 14 may be in a liquid phase, a gas phase, a supercritical fluid phase, or in a mixed phase. The phase of the fluid can be adjusted by controlling the temperature in the reactor 14 by the heater 16, and controlling the pressure in the reactor 14 by the pressure regulator.

The cooler 15 preferably cools the resulting fluid to 0-100° C., more preferably to 10-40° C. For example, when polyhydric alcohol is glycerin or ethylene diglycol, the resulting fluid is preferably cooled to 0-100° C., more preferably to 10-40° C. The target temperature can be adjusted by selecting the type or the structure of the cooler 15.

The collected water gas is purified to required quality depending on for which the water gas is used, such as fuel cells, hydrogen fuel, chemical materials, etc. The purification may be performed using a gas-permeable film, PSA, etc., for example.

In conventional production of water gas using polyhydric alcohol, soot (carbon) may be generated, and may adhere to the reactor. When the soot adheres to the catalyst, activity of the catalyst decreases, or the catalyst may degrade in a severe case. When the soot adheres to the reactor, the passage is blocked, the gas is overheated, and the reactor may break. The generation and adhesion of the soot can be reduced by suitably selecting reaction conditions. For example, when the steam ratio increases, the amount of steam increases relative to the amount of polyhydric alcohol, thereby reducing the generation of the soot. However, the increased steam ratio leads to loss of energy corresponding to latent heat of water, and reduces productivity.

According to the method for producing the water gas of the present embodiment, the material for water gas contains hydroxycarboxylic acid. Accordingly, polyhydric alcohol, hydroxycarboxylic acid, and water (steam) coexist in the reactor 14. This can significantly reduce the generation and adhesion of the soot. Thus, the degradation of the catalyst, and the break of the reactor due to the adhesion and accumulation of the soot can be prevented, and the frequency of cleaning (decoking) of the reactor 14 can be reduced, or the need for the maintenance of the reactor 14 can be eliminated.

Further, the concentration of carbon monoxide in the gas after the steam reforming can be reduced. This can reduce a load applied to the reactor 14 during a process of reducing carbon monoxide performed simultaneously with or after the steam reforming, such as a shift reaction of the water gas, CO selective oxidation, or methanation, thereby reducing costs of the device, and running costs.

In the method for producing the water gas of the present embodiment, the fluid material for water gas containing polyhydric alcohol, hydroxycarboxylic acid, and water is introduced in the reactor 14. However, the method is not limited thereto, and polyhydric alcohol, hydroxycarboxylic acid, and water (steam) may separately be introduced in the reactor. A mixture of polyhydric alcohol and hydroxycarboxylic acid, and water may separately be introduced in the reactor. A mixture of polyhydric alcohol and water, and hydroxycarboxylic acid may separately be introduced in the reactor. A mixture of hydroxycarboxylic acid and water, and polyhydric alcohol may separately be introduced in the reactor.

A material except for polyhydric alcohol, hydroxycarboxylic acid, and water may be added to the reactor 14 as long as the added material does not affect the reactivity and yield. Such a material may be, for example, gases such as hydrogen, carbon dioxide, nitrogen, argon, helium, oxygen, etc., organic materials such as organic acid, hydrocarbon, alcohol, aldehyde, etc., and salts thereof, inorganic salts, etc.

EXAMPLES (Production of Water Gas)

Example 1

A mixed solution of 26.1 g of glycerin (Kishida Chemical Co., Ltd., special grade), 10.0 g of L-lactic acid (Wako Pure Chemical Industries, Ltd., special grade), and 63.9 g of distilled water (Wako Pure Chemical Industries, Ltd.) was prepared as a material for water gas.

A reaction device of the same structure as that described in the above embodiment was prepared except that the product collecting part was replaced with a Tedler bag. A micro feed pump was used as the material feeding pump. A SUS316 pipe constituting a passage having an inner diameter of 1.0 mm, a length of 1.0 m, and a round cross section was used as the preheater. A nickel pipe (nickel purity>99.0%) constituting a passage having an inner diameter of 4.0 mm, a length of 0.1 m, and a round cross section was used as the reactor. The reactor was dividable in two in the longitudinal direction. Accordingly, the catalyst was nickel. A SUS316 pipe constituting a passage having an inner diameter of 1.0 mm, a length of 0.5 m, and a round cross section was used as the cooler. The cooler was an air-cooling cooler. An electric furnace capable of raising the temperature to 600° C. by radiation of heat, and keeping the raised temperature was used as the heater.

A pretreatment was performed by raising the temperature in the reaction device to 600° C., and keeping the temperature at 600° C. for 1 hour, while distributing hydrogen in the reaction device.

After the pretreatment, the material for water gas was placed in the material feeding part, the preheater and the reactor were heated to 600° C. by the heater, and the micro feed pump was operated to feed a fluid material for water gas at a flow rate of 0.434 mL/h. A resulting fluid containing water gas produced in the reactor was cooled to 30° C. in the cooler, and was collected in the Tedler bag. Residence time in the reactor, i.e., reaction time, was 4 seconds. Reaction pressure was 0.1 MPa. A steam ratio S/C (a molar ratio of water relative to carbon atoms) was 3. This reaction process took 5.3 hours.

Comparative Example 1

The same reaction process as that of Example 1 was performed except that a mixed solution of 36.2 g of glycerin (Kishida Chemical Co., Ltd., special grade), and 63.8 g of distilled water (Wako Pure Chemical Industries, Ltd.) was prepared as the material for water gas. The steam ratio S/C (the molar ratio of water relative to carbon atoms) was 3. The reaction process took 5.3 hours.

Example 2

A mixed solution of 34.4 g of glycerin (Kishida Chemical Co., Ltd., special grade), 1.7 g of L-lactic acid (Wako Pure Chemical Industries, Ltd., special grade), and 63.9 g of distilled water (Wako Pure Chemical Industries, Ltd.) was prepared as a material for water gas.

A reaction device of the same structure as that described in the above embodiment was prepared except that the product collecting part was replaced with a Tedler bag. A micro feed pump was used as the material feeding pump. A SUS316 pipe constituting a passage having an inner diameter of 1.0 mm, a length of 1.0 m, and a round cross section was used as the preheater. A nickel pipe (nickel purity>99.0%) constituting a passage having an inner diameter of 8.53 mm, a length of 0.2 m, and a round cross section was used as the reactor. Accordingly, the catalyst was nickel. A SUS316 pipe constituting a passage having an inner diameter of 2.18 mm, a length of 0.5 m, and a round cross section was used as the cooler. The cooler was an air-cooling cooler. An electric furnace capable of raising the temperature to 600° C. by radiation of heat, and keeping the raised temperature was used as the heater.

A pretreatment was performed by raising the temperature in the reaction device to 600° C., and keeping the temperature at 600° C. for 1 hour, while distributing hydrogen in the reaction device.

After the pretreatment, the material for water gas was placed in the material feeding part, the preheater and the reactor were heated to 600° C. by the heater, and the micro feed pump was operated to feed a material for water gas fluid at a flow rate of 1.301 mL/h. A resulting fluid containing water gas produced in the reactor was cooled to 30° C. in the cooler, and was collected in the Tedler bag. Residence time in the reactor, i.e., reaction time, was 8 seconds. Reaction pressure was 0.1 MPa. A steam ratio S/C (a molar ratio of water relative to carbon atoms) was 3. The reaction process took 26.3 hours.

Example 3

The same reaction process as that of Example 2 was performed except that a mixed solution of 34.9 g of glycerin (Kishida Chemical Co., Ltd., special grade), 1.5 g of glycolic acid, (Wako Pure Chemical Industries, Ltd., special grade), and 63.6 g of distilled water (Wako Pure Chemical Industries, Ltd.) was prepared as the material for water gas. The steam ratio S/C (the molar ratio of water relative to carbon atoms) was 3. The reaction process took 28.3 hours.

Comparative Example 2

The same reaction process as that of Example 2 was performed except that a mixed solution of 36.2 g of glycerin (Kishida Chemical Co., Ltd., special grade), and 63.8 g of distilled water (Wako Pure Chemical Industries, Ltd.) was prepared as the material for water gas. The steam ratio S/C (the molar ratio of water relative to carbon atoms) was 3. The reaction process took 28.0 hours.

(Evaluation Test)

<Rate of Consumption>

Liquid contained in each of the collected resulting fluids of Examples 1-3 and Comparative Examples 1-2 was analyzed by gas chromatography to quantify the concentration of unreacted material. The amount of the unreacted material was calculated by multiplying the concentration and the amount of the collected liquid. A percentage of the amount of the unreacted material relative to the total amount of the fed material for water gas was subtracted from 100 to obtain a rate of consumption.

<Observation of Soot (Carbon)>

The reactors of Example 1 and Comparative Example 1 were detached from the reaction devices, and each of them was divided in two in the longitudinal direction to visually observe the inside of the reactor.

<Quantification of Soot (Carbon)>

After the visual observation of the inside of each of the reactors of Example 1 and Comparative Example 1, each of the reactors was placed and dried in a vacuum desiccator, and mass of the reactor was measured. Then, soot adhered to the reactor was removed with a solvent, and the reactor was placed and dried again in the vacuum desiccator, and the mass of the reactor was measured. A difference between the masses was calculated to obtain an amount of collected carbon. An amount of carbon contained in the material for water gas was calculated to obtain an amount of distributed carbon. Percent by mass of the amount of collected carbon relative to the amount of distributed carbon was calculated to obtain a rate of carbon deposition.

<Composition Analysis, CO Selectivity>

Gas contained in each of the collected resulting fluids of Examples 2-3 and Comparative Example 2 was analyzed by gas chromatography to quantify concentrations of $H_2$, CO, $CO_2$, and $CH_4$ gases, respectively, and the number of moles of each gas was calculated by multiplying the concentration and the amount of the collected gas. Then, a ratio of the number of moles of each gas relative to the number of moles of glycerin contained in the material for water gas was calculated. A percentage of the number of moles of CO relative to the total number of moles of $H_2$, CO, $CO_2$, and $CH_4$ was calculated as CO selectivity.

(Results of Evaluation Test)

Tables 1 and 2 show the results of the evaluation test.

TABLE 1

| | Polyhydric alcohol (g) | | Hydroxycarboxylic acid (g) | | Water (g) | Residence time (s) | Distribution time (h) | Rate of consumption (%) | Amount of distributed carbon (mg) | Amount of collected carbon (mg) | Rate of carbon deposition (mass %) |
|---|---|---|---|---|---|---|---|---|---|---|---|
| Example 1 | Glycerin | 26.1 | Lactic acid | 10.0 | 63.9 | 4 | 5.3 | 100 | 357 | 1.7 | 0.5 |
| Comparative Example 1 | Glycerin | 36.2 | — | | 63.8 | 4 | 5.3 | 100 | 359 | 17.0 | 4.7 |

TABLE 2

| | Polyhydric alcohol (g) | | Hydroxycarboxylic acid (g) | | Water (g) | Residence time (s) | Distribution time (h) | Rate of consumption (%) | $H_2$ | CO | $CO_2$ | $CH_4$ | CO selectivity (mol %) |
|---|---|---|---|---|---|---|---|---|---|---|---|---|---|
| | | | | | | | | | (mol/mol) | | | | |
| Example 2 | Glycerin | 34.4 | Lactic acid | 1.7 | 63.9 | 8 | 26.3 | 100 | 5.71 | 0.63 | 2.22 | 0.13 | 7.2 |
| Example 3 | Glycerin | 34.9 | Glycolic acid | 1.5 | 63.6 | 8 | 28.3 | 100 | 4.87 | 0.80 | 1.85 | 0.15 | 10.4 |
| Comparative Example 2 | Glycerin | 36.2 | — | — | 63.8 | 8 | 28.0 | 100 | 4.66 | 1.46 | 1.42 | 0.08 | 19.2 |

The rate of consumption was 100% in Examples 1-3 and Comparative Examples 1-2.

The adhesion of soot (carbon) to the inside of the reactor was more significant in Comparative Example 1 than in Example 1.

The amount of soot (carbon) adhered to the inside of the reactor was 1.7 mg in Example 1, and was 17.0 mg in Comparative Example 1. The amount of carbon contained in the material for water gas was 357 mg in Example 1, and was 359 mg in Comparative Example 1. Accordingly, the rate of carbon deposition was 0.5 mass % in Example 1, and was 4.7 mass % in Comparative Example 1.

The collected resulting fluid of Example 2 contained 5.71 mol/mol of $H_2$, 0.63 mol/mol of CO, 2.22 mol/mol of $CO_2$, and 0.13 mol/mol of $CH_4$. The collected resulting fluid of Example 3 contained 4.87 mol/mol of $H_2$, 0.80 mol/mol of CO, 1.85 mol/mol of $CO_2$, and 0.15 mol/mol of $CH_4$. The collected resulting fluid of Comparative Example 2 contained 4.66 mol/mol of $H_2$, 1.46 mol/mol of CO, 1.42 mol/mol of $CO_2$, and 0.08 mol/mol of $CH_4$.

The CO selectivity was 7.2 mol % in Example 2, 10.4 mol % in Example 3, and 19.2 mol % in Comparative Example 2.

INDUSTRIAL APPLICABILITY

The present invention is useful for a material for water gas, a method for producing the water gas, and the water gas.

DESCRIPTION OF REFERENCE CHARACTERS

10 Reaction device
11 Material feeding part
12 Material feeding pump
13 Preheater
14 Reactor
15 Cooler
16 Heater
17 Product collecting part

The invention claimed is:

1. A material for water gas containing polyhydric alcohol, and a content of hydroxycarboxylic acid which is 0.1-50 parts by mass, relative to 100 parts by mass of polyhydric alcohol.

2. The material for water gas of claim 1, wherein the number of carbons contained in a molecule of the hydroxycarboxylic acid is 2-4.

3. The material for water gas of claim 1 or 2, wherein the polyhydric alcohol is glycerin.

4. The material for water gas of claim 1, further containing water.

5. A method for producing water gas comprising:
   introducing polyhydric alcohol, hydroxycarboxylic acid, and water in a reactor containing a catalyst; and
   causing steam reforming in the reactor at a temperature of 500-1000° C,
   wherein a content of the hydroxycarboxylic acid is 0.1-50 parts by mass relative to 100 parts by mass of the polyhydric alcohol.

6. The method for producing water gas of claim 5, wherein the number of carbons contained in a molecule of the hydroxycarboxylic acid is 2-4.

7. The method for producing water gas of claim 5, wherein the polyhydric alcohol is glycerin.

8. The method for producing water gas of claim 5, wherein the steam reforming is performed at a pressure of 0.01-10 MPa.

* * * * *